United States Patent
Chen et al.

(10) Patent No.: US 8,098,245 B2
(45) Date of Patent: Jan. 17, 2012

(54) SMART NAVIGATION FOR 3D MAPS

(75) Inventors: Billy Chen, Bellevue, WA (US); Eyal Ofek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 722 days.

(21) Appl. No.: 12/242,733

(22) Filed: Sep. 30, 2008

(65) Prior Publication Data
US 2010/0080466 A1   Apr. 1, 2010

(51) Int. Cl.
*G06T 15/00*   (2006.01)
(52) U.S. Cl. ........ 345/419; 382/103; 382/154; 700/253; 700/255; 715/863
(58) Field of Classification Search .................. 345/419; 382/103, 154; 700/253, 255; 715/863
See application file for complete search history.

(56) References Cited

U.S. PATENT DOCUMENTS

| | | | |
|---|---|---|---|
| 5,758,298 A | 5/1998 | Guldner | |
| 6,004,016 A | 12/1999 | Spector | |
| 6,708,112 B1 | 3/2004 | Beesley et al. | |
| 6,915,310 B2 | 7/2005 | Gutierrez et al. | |
| 7,372,977 B2 | 5/2008 | Fujimura et al. | |
| 7,519,457 B2 * | 4/2009 | Hasegawa et al. | 701/23 |
| 7,630,792 B2 * | 12/2009 | Kim | 700/245 |
| 7,937,285 B2 * | 5/2011 | Goldberg et al. | 705/7.31 |
| 7,965,295 B2 * | 6/2011 | Herbrich et al. | 345/474 |
| 7,970,176 B2 * | 6/2011 | Kutliroff et al. | 382/103 |
| 2006/0293792 A1 | 12/2006 | Hasegawa et al. | |

FOREIGN PATENT DOCUMENTS
WO  WO-2007/012895  2/2007

OTHER PUBLICATIONS

Li et al., "An Intelligent User Interface with Motion Planning for 3D Navigation," IEEE VR2000, http://robotics.stanford.edu/~latombe/cs326/2003/class10/li.pdf.
Steinhaus et al., "Autonomous Robot Navigation in Human-Centered Environments Based on 3D Data Fusion," Hindawi Publishing Corporation, 2007, http://www.hindawi.com/Getpdf.aspx?doi=10.1155/2007/86831.
"Global Approach to Potential-Guided Path Planning," http://robotics.stanford.edu/~mitul/rmp/.
Shimoda et al., "Potential Field Navigation of High Speed Unmanned Ground Vehicles on Uneven Terrain," IEEE 2005, http://scripts.mit.edu/~robots/robots/publications/papers/2005_04_Shi_Kur_lag.pdf.
Pundt et al., "Visualization of Spatial Data for Field Based GIS," Elsevier Science Ltd., 2000, http://stat.chonnam.ac.kr/~metstat/data/geostat_005.pdf.

* cited by examiner

*Primary Examiner* — Phu Nguyen
(74) *Attorney, Agent, or Firm* — The Law Office of Michael E. Kondoudis

(57) ABSTRACT

An interest center-point and a start point are created in an image. A potential function is created where the potential function creates a potential field and guides traversal from the starting point to the interest center-point. The potential field is adjusted to include a sum of potential fields directed toward the center-point where each potential field corresponds to an image. Images are displayed in the potential field at intervals in the traversal from the start point toward the interest center point.

20 Claims, 4 Drawing Sheets

SMART NAVIGATION FOR 3D MAPS

BACKGROUND

This Background is intended to provide the basic context of this patent application and it is not intended to describe a specific problem to be solved.

With the advent of fast graphics hardware and the generation of three dimensional (3D) content, 3D navigation is becoming important as users are finding themselves immersed more and more in 3D. Map applications like Virtual Earth and Google Earth enable a user to fly in 3D to realistic cities, to see what it looks like to be there. From real estate to golf courses, people are navigating 3D worlds to browse them for a sense of being there.

Unfortunately, navigating in 3D is difficult for a novice user. The user must fly up and down in altitude as well as moving on a flat plane. In addition, the virtual camera can roll, pitch, or yaw, adding more headaches for navigation. To avoid these problems, current solutions restrict how the user can navigate. For example, in games, a 3D avatar primarily walks on the ground, so the user can click the 2D ground and the avatar walks towards it. Although the world 3D, the navigation is on the 2D ground.

In other 3D applications, the view may also change in altitude (e.g. flying off the ground). In a flight simulator, 3D navigation is restricted to relative actions. In other words, the jet or airplane is moving in a forward direction, the user can change the relative direction of the plane. For example, pressing the 'up' key pushes the nose of the plane down, causing it to the travel in a downward direction. In 3D map applications like Virtual Earth, 3D navigation is restricted to two primary modes: 1) zooming into the map (e.g. changing altitude) and 2) panning on the map (e.g. translating on a plane at a given altitude).

Restricting the 3D navigation controls makes it easier to fly in 3D. Unfortunately, this form of navigation also neglects interesting views, which may be useful for a user. For example, to navigate to Seattle in 3D, the novice user will most likely pan over to the west coast of the US, zoom in, pan again to the north part of the coast, zoom in again, pan to the Puget Sound, zoom in, pan again to the city and finally zoom in. While this flight will eventually get a novice user to Seattle, it is not the most intuitive flight when users think of entering Seattle.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method and system of traversing a three dimensional image is disclosed. An interest center-point and a start point are created in the image. A potential function is created where the potential function creates a potential field and guides traversal from the starting point to the interest center-point. The potential field is adjusted to include a sum of potential fields directed toward the center-point where each potential field corresponds to an image. Images are displayed in the potential field at intervals in the traversal from the start point toward the interest center point.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
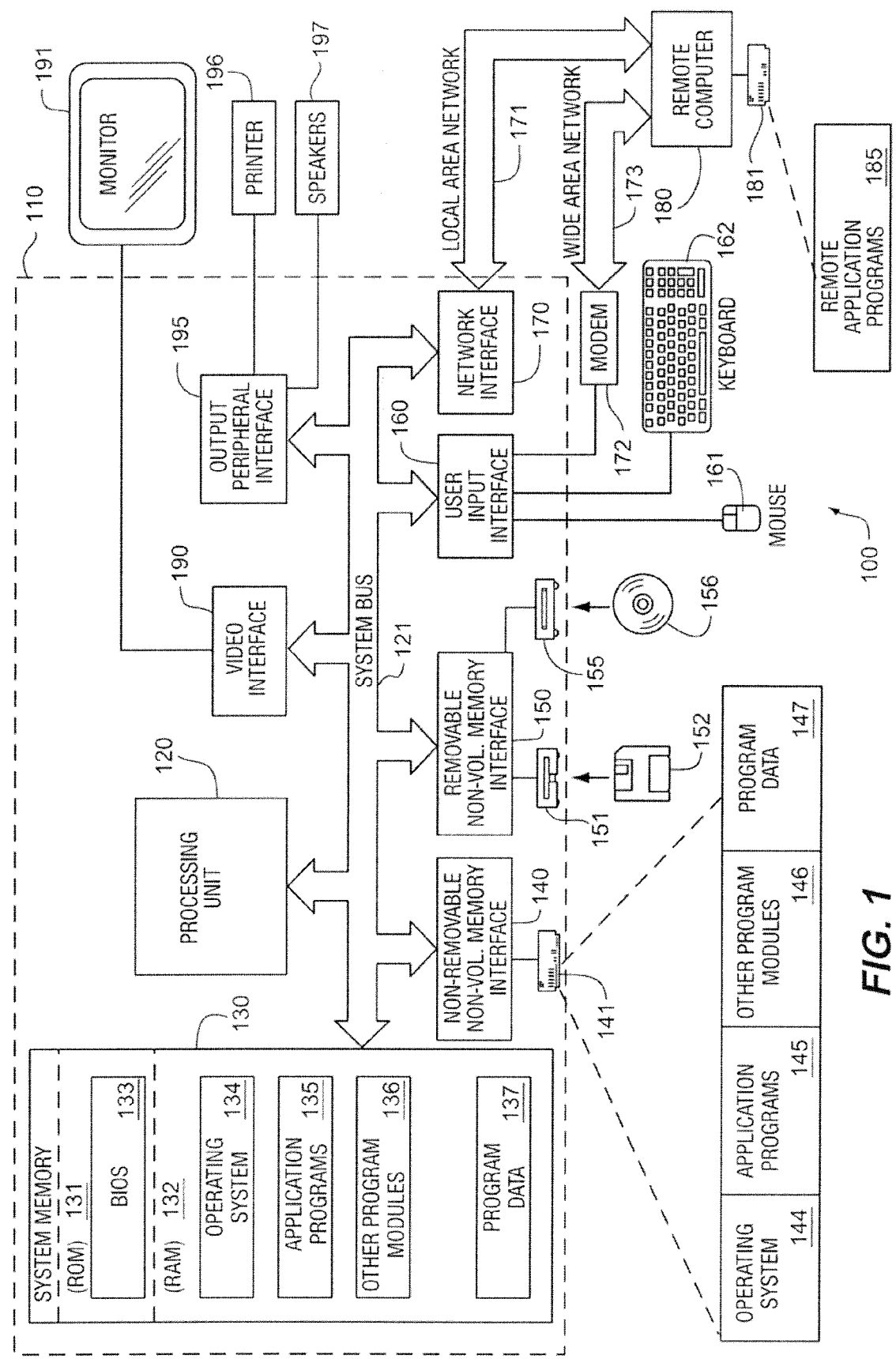
FIG. 1 is an illustration of a portable computing device.

FIG. 1 illustrates an example of a suitable computing system environment 100 that may operate to display and provide the user interface described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to a optical disk 156. The hard disk drive 141, 151, and 155 may interface with system bus 121 via interfaces 140, 150.

A user may enter commands and information into the computer 20 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 190.

Figure 2:
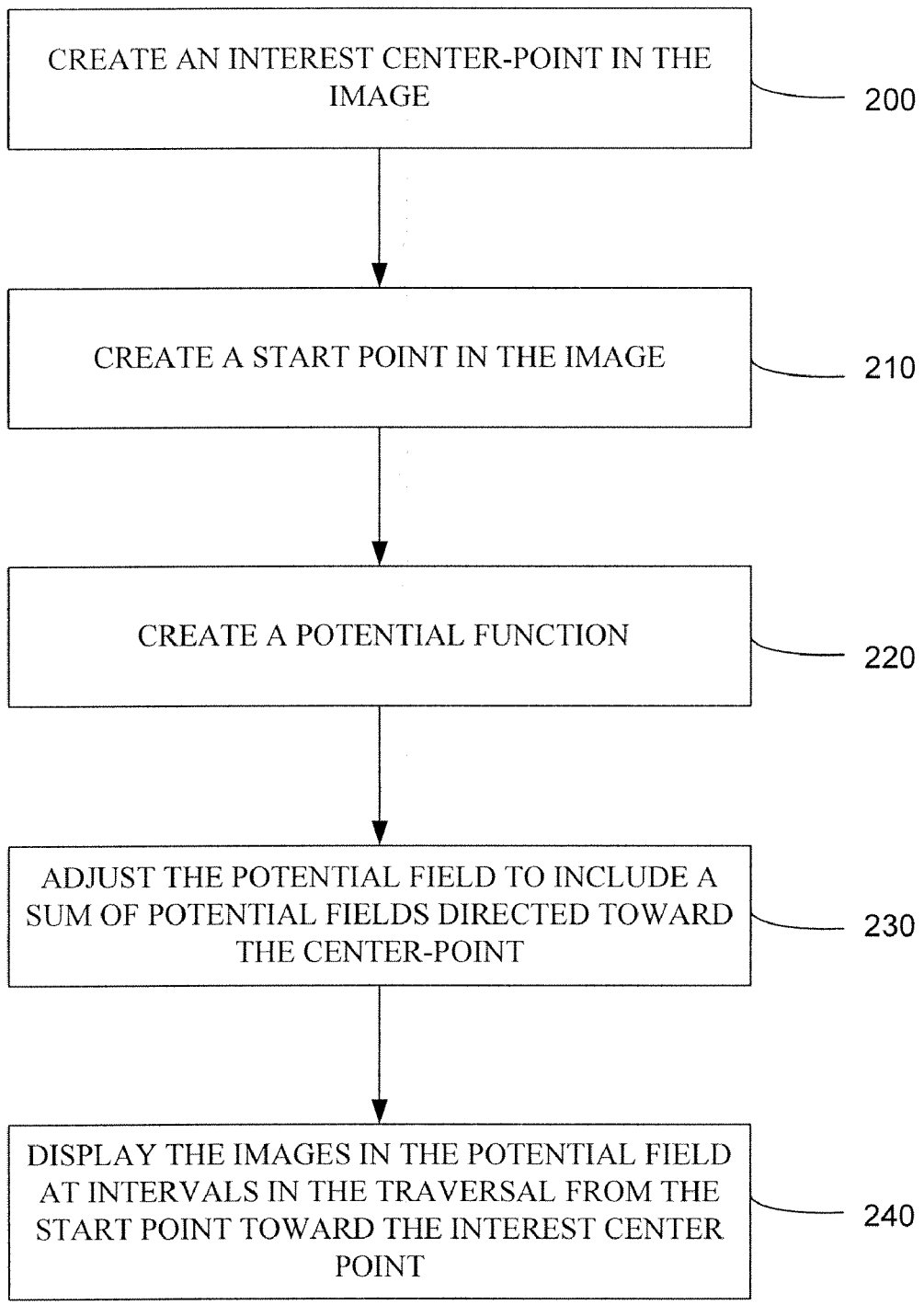
FIG. 2 is an illustration of a method of traversing a three dimensional image.

FIG. 2 may illustrate a method traversing a three dimensional image from a start point to an end point using the computer system as described in reference to FIG. 1. When people think of getting to Seattle, they often think of a smooth path that starts at a globe-view, and then continuously drops in altitude while flying toward the city. People usually think of the flight as a view from an airplane, traveling to a view of the characteristic Seattle skyline. Many modern systems simply zoom in on a point which is an unnatural way of approaching a city or location. The method and system described may provide a more natural navigation experience for a novice user flying in 3D.

Figure 3:
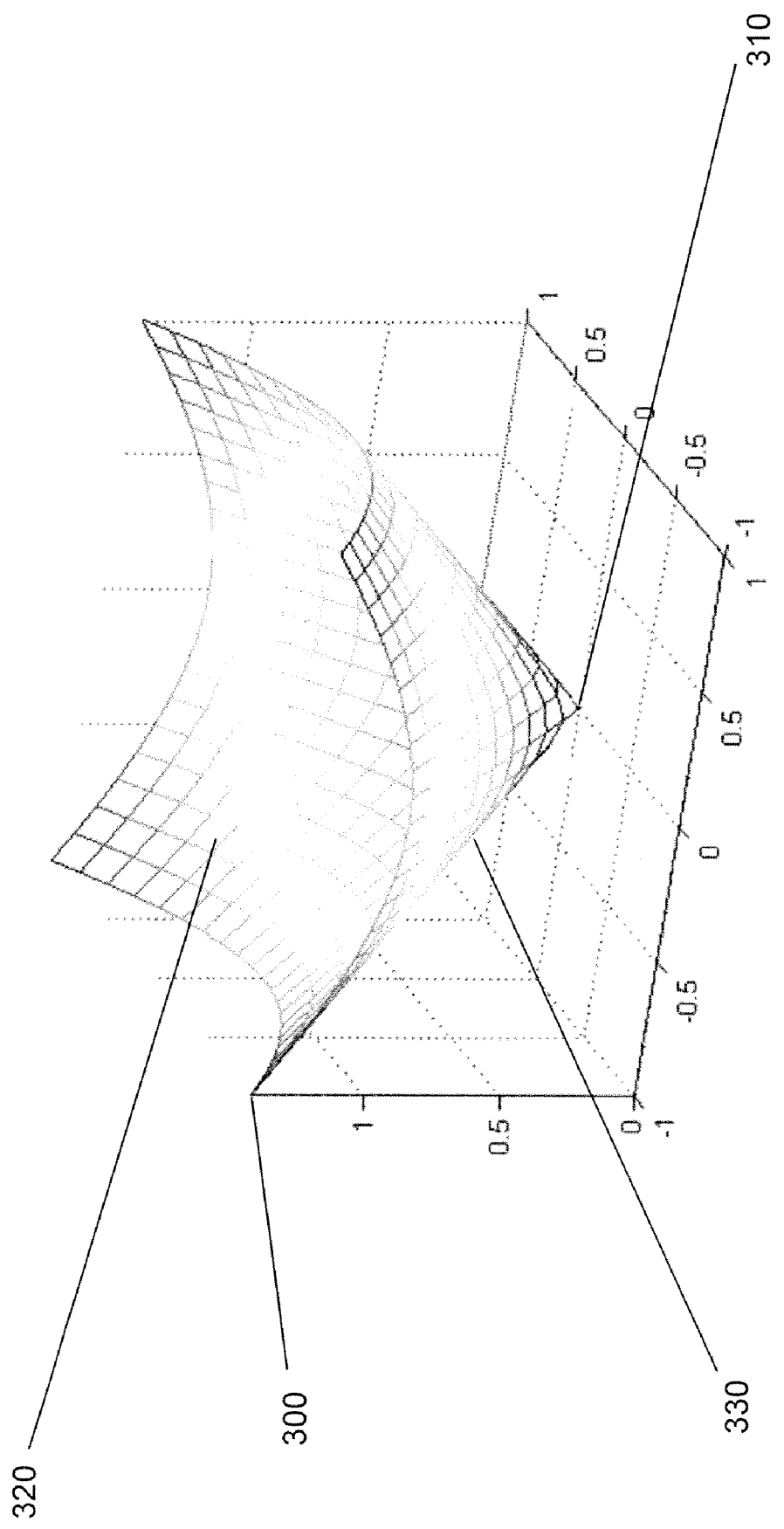
FIG. 3 is a 3-D image of a start point and an end point in a potential field.

In order to accomplish the more natural appearance, a database of recorded camera positions is used. These camera positions may come from a variety of sources, including recorded virtual flights into cities, geo-positioned photographs, GPS trails, cell-tower positions of cell phones and vendor-specific data, like street vector data. In one embodiment, each camera position may be treated as an attractive potential. For example, in FIG. 3, the camera may be located at (0,0). In this case, the attraction function is simply the distance from the center, (0,0). The idea is that any start position 320, the virtual camera's position will to be attracted to these camera positions in the database. FIG. 3 illustrates a 3D view of this potential field 300. If a virtual camera starts at any starting position 320, it will "roll" down towards the center point 310 at 0,0.

Returning to FIG. 2, a method of traversing a three dimensional image 300 is disclosed. At block 200, in the image 300, an interest center-point 310 is created. The center point 310 may be virtually any point in a 3-D illustration. The center may also be an area, which is an aggregation of multiple center points. Examples, and not limitations, are downtowns, commonly viewed areas, famous places, airports, sport venues, etc. The center point 310 may be the point to which the view will be directed and may end. As an example, if the image 300 is of Chicago, the end point 310 may be Buckingham Fountain which is a logical center point to see the beauty of Chicago.

At block 210, a start point 320 may be created in the image 300. Similar to the center point 310, the start point may be any point. In some embodiments, the start point 320 may be a logical introduction point to an area. For example, in Chicago, the start point 320 may be either end of Lake Shore Drive where peaks of the downtown skyline may be obtained while traveling toward downtown which may be the center point 310. The term "point" may also include a popular view direction, not just position.

Both the center point 310 and start point 320 may be created in a variety of ways. In one embodiment, a 2-d map is displayed and a user may select a start point 320 and the interest point 310. The user then may have additional options regarding how to approach the interest point 310 such as from the sky, on roads, by train, etc. In another embodiment, the user selects different paths from a drop down list. Of course, other manners of selecting the center point 310 and the start point 320 are possible and are contemplated.

In some embodiments, the center-point 310 and start point 320 may be adjusted. For example, while virtually flying into Chicago, a user may desire to make Wrigley Field the center point 310. The adjustment may be made by a selection, such as moving a pointer from downtown to Wrigley Field. In another embodiment, the start point 320 may be adjusted to better reflect a location of interest to the user, such as a friend's house or from a different city.

At block 220, a potential function may be created. The potential function may create a potential field and may guide traversal from the starting point 310 to the interest center-point 320. Based on the user's target position 310 and a GIS database of camera positions, a potential field 330 may be generated. This potential field 330 may be a sum of fields, each one corresponding to a camera position in the database. To generate the potential field 330, each point (x,y,z) may have an associated vector (u,v,w). The potential field 330 may be described by the following equation:

Let $D(x,y,z)=sqrt(x^2+y^2+z^2)$ then $u(x,y,z)=\alpha*\partial D/\partial x$ $v(x,y,z)=\beta*\partial D/\partial y$ $w(x,y,z)=\gamma*\partial D/\partial z$ The greek symbols, $\alpha$, $\beta$, and $\gamma$ are weights that may be user adjustable. The vectors 400 u, v, and w are plotted as arrows in FIG. 4. The potential field 330 may allow small variations from a traversal path but in general, as the path becomes further from the center point 310, the potential field 330 continues to push toward the center point 310. The equation D is one example of a potential field. The potential field may be described in using a Gaussian or other equations. One key property of any such potential field is that its global minimum is located at the interest center-point.

The small variations from the path may be obtained by receiving input such as directional input from users. The directional input may be used to adjust the weights $\alpha$, $\beta$, and $\gamma$ on the different directions x, y, z. The method may calculate the distance from a current location to the center-point 310, may calculate a path toward the center-point 310 that minimizes the distance from the current location to the center-point 310 and the method may proceed to move on the path.

The unsigned distance function D may have been any number of functions, including a local Gaussian, box, triangle, etc. The choice of function may affect the area of effect for each camera position and its convergence time.

Figure 4:
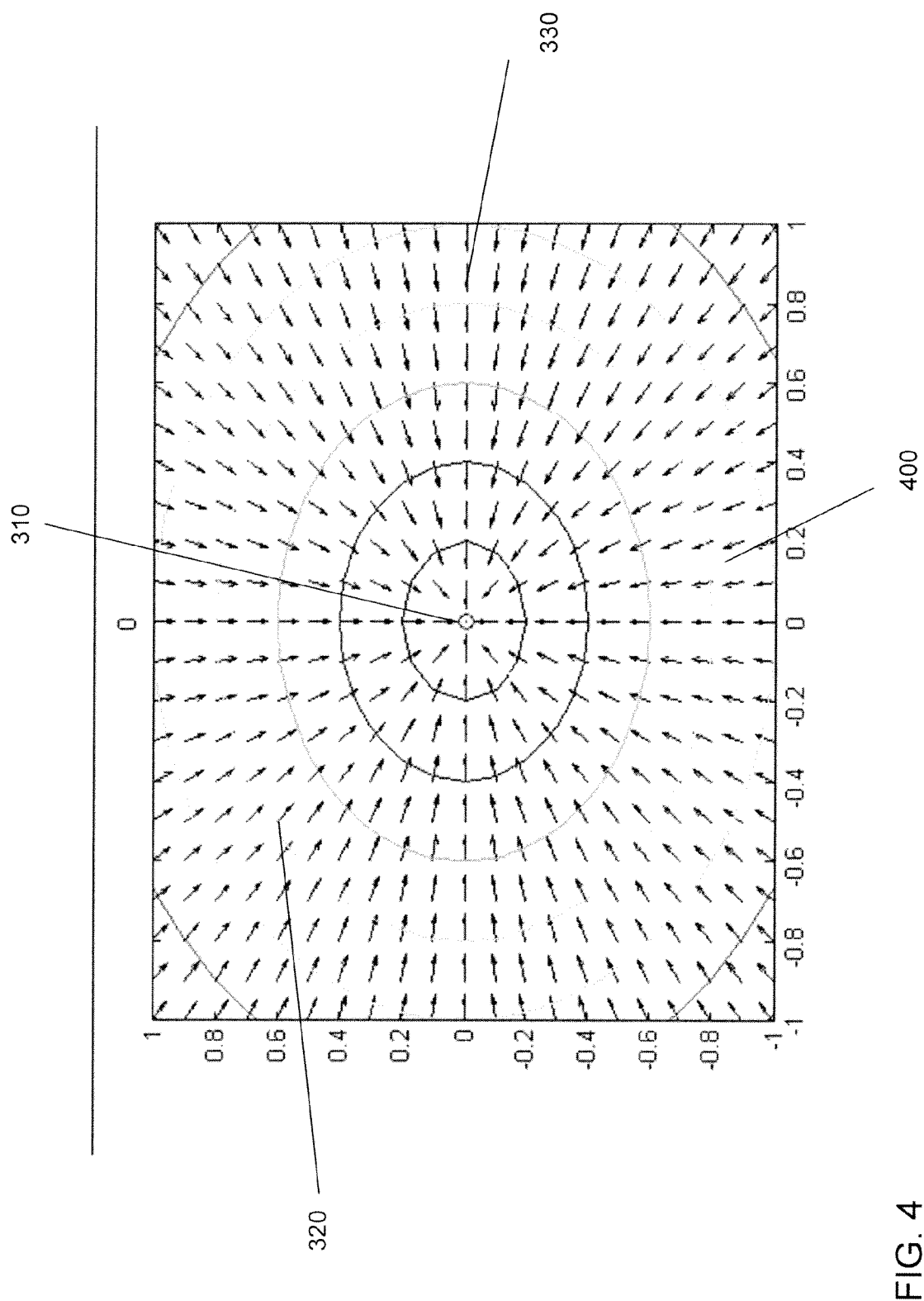
FIG. 4 is an illustration of a vector field that represents the potential field.

The vector field shown in FIG. 4 may describe how to update a virtual camera position, given a potential field. Similar to Euler's method for solving ordinary differential equations, at any position, the next camera position may be computed as:

$$P_{k+1}=P_k+[u, v, w]^T$$

Intuitively, the method may start at a position in the vector field 330. To find the next position, the method may evaluate the local "arrows," and add the closest arrow to a current position. The result becomes a next position. Euler's method is of many possible techniques for traversing the vector field.

In most cases, there is more than one camera position in the GIS database. In this case, the potential field 330 may be a summation of all the potential fields 330 for each camera position in the GIS database. From any starting position, the virtual camera may tend to converge onto the line of the cameras. The equation below may describes the summed potential field $$S=\Sigma D_c$$

where $c \in \{\text{GIS positions}\}$.

To force the virtual camera to go to the center-point 310, the method may add a potential field 330 corresponding to the target 310. To ensure that a user ends up at the center point 310, the method may implement a time-varying potential field 330 which lets the virtual camera explore new regions, but ends in bringing the camera to the final destination of the center point 310.

In some embodiments, the potential fields 330 remain static over time. In another embodiment such as in a time-varying potential field 330 embodiment, the function may change over time. Specifically, the method may seek a time-varying potential field 330 that will allow the virtual camera to be attracted to other GIS positions, but also eventually converge to the final destination 310.

To accomplish this, the method may use a time-varying weighting factor $w_t$ which varies between 0 and 1. Then, the output potential field may be a linear combination of the summed potential field S, and the target field T:

$$F_t=(1-w_t)*S+w_t*T$$

When $w_t=0$, the potential field F may match the summed field S. When $w_t=1$, then the potential field may be the target T. The weigh factor may be applied to the potential field to allow for a deviation from the center-point toward the point of interest. The method may create a point of interest sum of fields directed toward the point of interest, may apply an increasing weight to the point of interest sum of fields and a decreasing weight to the center-point sum of fields where the weights sum to 1 and creating a summed fields by adding the weighted point of interest field to the weight center point field. The travel may then be governed according to the summed field.

In another embodiment, the weight for the point of interest sum of fields may be reduced to 0. A lower weight may be applied to the center-point for a time period and as the time period decreases, a greater weight may be placed on the center-point. Of course, other weighting schemes are possible and are contemplated.

In addition, the potential field 330 may be modified to reflect the user's preferences. For example, if a user wishes to avoid corn fields in a flight, corn fields may serve as rejectors, where the potential field 330 pushes the virtual camera away. In mathematical term, the weights may be made negative to force the path away from the rejectors.

At block 230, the potential field may be adjusted to include a sum of potential fields directed toward the center-point 310 where each potential field 330 corresponds to an image. As explained previously, the path may follow the potential field as directed.

At block 240, the images available in the potential field 330 may be displayed at intervals in the traversal from the start point 320 toward the interest center point 310. The resulting image may appear in a continuous, movie like fashion from the start point 310 to the interest point 320.

Given this framework for creating a potential field 330 from the database of camera positions, smart navigation paths may be created for a user simply by traversing the potential field 330. From the user's perspective, the navigation is simple. The virtual camera may start in any position 310 near the Earth or another area of interest. The user may specify a target position 310, such as Seattle, or a landmark, or a building, etc. The path may prove a graceful path from the mountains surrounding Seattle, past downtown Seattle and the waterfront areas to the Seattle-Tacoma Airport.

In one embodiment, a camera's navigation may be through the use of location-based data. Location-based data may include previous camera paths, locations of landmarks, community generated locations of importance and professional generated locations of importance, etc.

This kind of smart navigation may have a variety of useful applications. In the example given above, a user wishes to fly to Seattle from a globe-view of the Earth. Using the method, the virtual camera would be attracted to other camera positions where users have either 1) flew to Seattle in a more intuitive, airplane-like view, or 2) placed geo-position photos, of, for example, the Seattle skyline. The navigation need not be from a globe-view down to a city-view. The method, for example, may compute smart navigation from Seattle to San Francisco, or create tours along a neighborhood. The method also could use street vector data as attraction points so that a user's flight will travel along major highways. Another use is for viewing landmarks in a city. Instead of camera positions serving as attractors in the potential field, landmarks, like the Seattle Space Needle, could serve as attractors.

The above text describe the system related to camera position. The same can be expanded to include the parameters related to the rotation of the camera. The result may be that during a flight, the camera may change view direction to better show popular items on the way. For example, a drive in front of the White House may cause the virtual camera to turn aside and see the White House, as a user pass by it (although the camera will point away from the original drive direction).

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of traversing a three dimensional image, performed by a computer, comprising
   creating an interest center-point in the image;
   creating a start point in the image;
   creating a potential function, wherein the potential function creates a potential field and guides traversal from the starting point to the interest center-point;
   adjusting the potential field to comprise a sum of potential fields directed toward the center-point wherein each potential field corresponds to an image; and
   displaying images in the potential field at intervals in the traversal from the start point toward the interest center-point.

2. The method of claim 1, further comprising accepting input as to the direction of the traversal to be added to the potential function.

3. The method of claim 1, further comprising allowing the center-point and start point to be adjusted.

4. The method of claim 1, further comprising associating a vector with each point in the potential field.

5. The method of claim 1, wherein the creating a potential function further comprises:
   accepting directional input;
   adding the directional input as a weight;
   moving to a current location;
   calculating the distance from a current location to the center-point;
   calculating a path toward the center-point that minimizes the distance from the current location to the center-point; and
   moving on the path.

6. The method of claim 1, further comprising an attraction point in the image that is distinct from the center-point and the start point.

7. The method of claim 6, further comprising adding a time-varying weight factor to the potential function.

8. The method of claim 7, wherein the weight factor is applied to the potential field to allow for a deviation from the center-point toward the point of interest by:
   creating point of interest sum of fields directed toward the point of interest;
   applying an increasing weight to the point of interest sum of fields and a decreasing weight to the center-point sum of fields where the weights sum to 1;
   creating a summed fields by adding the weighted point of interest field to the weight center point field;
   traveling according to the summed field;
   allowing the weight for the point of interest sum of fields to equal 1;
   reducing the weight for the point of interest sum of fields to 0; and
   allowing a lower weight to the center-point for a time period and as the time period decreases, placing greater weight on the center-point.

9. The method of claim 1, further comprising displaying the images in a continuous fashion from the start point to the interest point.

10. The method of claim 1, further comprising controlling a camera's navigation through the use of location-based data.

11. The method of claim 10, wherein the location-based data comprises previous camera paths, locations of landmarks, community generated locations of importance and professional generated locations of importance.

12. A computer storage medium storing computer executable instructions that, when executed by a computer, cause the computer to execute a method of traversing a three dimensional image, the method comprising:
   creating an interest center-point in the image;
   creating a start point in the image;
   creating a potential function, wherein the potential function creates a potential field and guides traversal from the starting point to the interest center-point;
   adjusting the potential field to comprise a sum of potential fields directed toward the center-point wherein each potential field corresponds to an image;
   accepting input as to the direction of the traversal to be added to the potential function; and
   displaying images in the potential field at intervals in the traversal from the start point toward the interest center-point.

13. The computer storage medium of claim 12, wherein the creating a potential function further comprises:
   adding the directional input as a weight;
   moving to a current location;
   calculating the distance from a current location to the center-point;
   calculating a path toward the center-point that minimizes the distance from the current location to the center-point; and
   moving on the path.

14. The computer storage medium of claim 12, further comprising computer executable instructions for creating an attraction point in the image that is distinct from the center-point and the start point.

15. The computer storage medium of claim 12, further comprising computer executable instructions adding a time-varying weight factor to the potential function.

16. The computer storage medium of claim 15, wherein the weight factor is applied to the potential field to allow for a deviation from the center-point toward the point of interest by:
   creating point of interest sum of fields directed toward the point of interest;
   applying an increasing weight to the point of interest sum of fields and a decreasing weight to the center-point sum of fields where the weights sum to 1;
   creating a summed fields by adding the weighted point of interest field to the weight center point field;
   allowing the weight for the point of interest sum of fields to equal 1;
   reducing the weight for the point of interest sum of fields to 0;
   allowing a lower weight to the center-point for a time period and as the time period decreases, placing a greater weight on the center-point; and
   traveling according to the summed field.

17. The computer storage medium of claim 12, further comprising computer executable instructions for displaying the images in a continuous fashion from the start point to the interest point.

18. A computer system comprising a processor, a memory in communication with the processor and an input output circuit, the processor being adapted to execute computer executable instructions for traversing a three dimensional image, the computer executable instructions comprising instructions for:
creating an interest center-point in the image;
creating a start point in the image;
creating a potential function, wherein the potential function creates a potential field and guides traversal from the starting point to the interest center-point:
adjusting the potential field to comprise a sum of potential fields directed toward the center-point wherein each potential field corresponds to an image;
accepting input as to the direction of the traversal to be added to the potential function; and
displaying images in the potential field at intervals in the traversal from the start point toward the interest center point.

19. The computer system of claim 18, wherein the creating a potential function further comprises:
adding the directional input as a weight;
moving to a current location;
calculating the distance from a current location to the center-point;
calculating a path toward the center-point that minimizes the distance from the current location to the center-point; and
moving on the path.

20. The computer system of claim 18, further comprising instructions for adding a time-varying weight factor to the potential function, wherein the weight factor is applied to the potential function to allow for a deviation from the center-point toward the point of interest by:
creating point of interest sum of fields directed toward the point of interest;
applying an increasing weight to the point of interest sum of fields and a decreasing weight to the center-point sum of fields where the weights sum to 1;
creating a summed fields by adding the weighted point of interest field to the weight center point field;
traveling according to the summed field; and
as the time period decreases, placing a greater weight on the center-point.

* * * * *

UNITED STATES PATENT AND TRADEMARK OFFICE
CERTIFICATE OF CORRECTION

| | |
|---|---|
| PATENT NO. | : 8,098,245 B2 |
| APPLICATION NO. | : 12/242733 |
| DATED | : January 17, 2012 |
| INVENTOR(S) | : Billy Chen et al. |

It is certified that error appears in the above-identified patent and that said Letters Patent is hereby corrected as shown below:

In column 7, line 13, in Claim 1, after "center-point" insert -- , --.

In column 7, line 57, in Claim 8, delete "placing" and insert -- placing a --, therefor.

In column 9, line 7, in Claim 18, delete "center-point:" and insert -- center-point; --, therefor.

Signed and Sealed this
Sixth Day of March, 2012

David J. Kappos
*Director of the United States Patent and Trademark Office*